US008809439B2

(12) United States Patent
Suzuki et al.

(10) Patent No.: US 8,809,439 B2
(45) Date of Patent: Aug. 19, 2014

(54) CALCIUM HYDROXIDE, RESIN COMPOSITION CONTAINING THE SAME, AND MOLDED ARTICLE CONTAINING THE COMPOSITION

(75) Inventors: Takafumi Suzuki, Kagawa (JP); Masatoshi Matsushima, Kagawa (JP); Seiji Miyauchi, Kagawa (JP); Hitoshi Manabe, Kagawa (JP); Yoshiharu Sawa, Kagawa (JP)

(73) Assignee: Kyowa Chemical Industry Co., Ltd., Kagawa (JP)

( * ) Notice: Subject to any disclaimer, the term of this patent is extended or adjusted under 35 U.S.C. 154(b) by 1104 days.

(21) Appl. No.: 10/579,389

(22) PCT Filed: Nov. 11, 2004

(86) PCT No.: PCT/JP2004/017120

§ 371 (c)(1),
(2), (4) Date: Jun. 14, 2006

(87) PCT Pub. No.: WO2005/047184

PCT Pub. Date: May 26, 2005

(65) Prior Publication Data

US 2007/0082978 A1 Apr. 12, 2007

(30) Foreign Application Priority Data

Nov. 13, 2003 (JP) ................................ 2003-383824
Nov. 13, 2003 (JP) ................................ 2003-383825

(51) Int. Cl.

| | |
|---|---|
| ***C08K 3/10*** | (2006.01) |
| ***C08K 9/10*** | (2006.01) |
| ***C01F 11/02*** | (2006.01) |
| ***C04B 26/02*** | (2006.01) |
| ***C08K 3/22*** | (2006.01) |
| ***C09C 1/02*** | (2006.01) |
| ***C04B 22/06*** | (2006.01) |

(52) U.S. Cl.

CPC ............... *C09C 1/02* (2013.01); *C01P 2006/12* (2013.01); *C01F 11/02* (2013.01); *C01P 2004/61* (2013.01); *C04B 26/02* (2013.01); *C08K 3/22* (2013.01); *C08K 2003/2206* (2013.01); *C04B 22/064* (2013.01)

USPC .......................................... 524/436; 523/210

(58) Field of Classification Search

USPC .......................................... 523/210; 524/436

See application file for complete search history.

(56) References Cited

U.S. PATENT DOCUMENTS

| | | | | |
|---|---|---|---|---|
| 3,650,704 | A | 3/1972 | Kumura et al. | |
| 3,778,494 | A | 12/1973 | Helser | |
| 3,879,525 | A | 4/1975 | Miyata et al. | |
| 4,129,447 | A | 12/1978 | Roth et al. | |
| 6,291,570 | B1 * | 9/2001 | Katsuki et al. | 524/434 |
| 6,592,834 | B1 * | 7/2003 | Miyata | 423/265 |
| 2004/0147660 | A1 * | 7/2004 | Ishida et al. | 524/442 |

FOREIGN PATENT DOCUMENTS

| | | | |
|---|---|---|---|
| DE | 1 245 825 | 7/1967 | |
| EP | 0 467 165 | 1/1992 | |
| GB | 1 217 813 | 12/1970 | |
| GB | 2 194 523 | 3/1988 | |
| JP | 46-2280 | 1/1971 | |
| JP | 47-32198 | 8/1972 | |
| JP | 48-29477 | 9/1973 | |
| JP | 50-102620 | 8/1975 | |
| JP | 50-30039 | 9/1975 | |
| JP | 51-29129 | 8/1976 | |
| JP | 57-106521 | 7/1982 | |
| JP | 60-86066 | 5/1985 | |
| JP | 6-316662 | 11/1994 | |
| JP | 9-110423 | 4/1997 | |
| JP | 9-278435 | 10/1997 | |
| JP | 10-167775 | 6/1998 | |
| JP | 11-193336 | 7/1999 | |
| JP | 2001-123071 | 5/2001 | |
| JP | 2003-138149 | 5/2003 | |
| JP | 2003-327427 | 11/2003 | |
| JP | 2004-161513 | 6/2004 | |
| WO | WO 03010091 A1 * | 2/2003 | C08K 3/34 |

OTHER PUBLICATIONS

Machinie Translation of JP 09-278435.*
Machine Translation of JP 2003-327427.*
Kooli,F, K. Kosuge, T. Hibino, and A. Tsunashima. (1993) Synthesis and properties of Mg-Zn-Al-SO4 hydrotalcite like compounds. Journal of Material Science 28, pp. 2769-2773.*
Lenntech (1998) Silicon (Si) and Water: Reaction Mechanisms Online at: http://www.lenntech.com/periodic/water/silicon/silicon-and-water.htm.*
European Search Report issued Jul. 28, 2011 in corresponding European Application No. 11 16 7333.
Supplementary European Search Report dated Jun. 19, 2009, issued in corresponding European Application No. 04 79 9733.

* cited by examiner

*Primary Examiner* — Hui Chin
(74) *Attorney, Agent, or Firm* — Wenderoth, Lind & Ponack, L.L.P.

(57) ABSTRACT

There are provided calcium hydroxide having a large specific surface area, a resin composition comprising the calcium hydroxide and having excellent thermal stability, and a molded article and a stabilizer for synthetic resins which comprise the calcium hydroxide.

There are provided a calcium hydroxide compound represented by the following formula (1):

$$Ca(OH)_{2-nx}(A^{n-})_x \quad (1)$$

(wherein n represents an integer of 1 to 4, x represents a number of 0.001 to 0.2, and $A^{n-}$ represents an anion derived from at least one compound selected from the group consisting of a silicon-based compound, a phosphorus-based compound, an aluminum-based compound, an inorganic acid and an organic acid.), and a synthetic resin, a molded article and a stabilizer for synthetic resins which comprise the compound.

9 Claims, No Drawings

CALCIUM HYDROXIDE, RESIN COMPOSITION CONTAINING THE SAME, AND MOLDED ARTICLE CONTAINING THE COMPOSITION

TECHNICAL FIELD

The present invention relates to calcium hydroxide formed of a solid solution with a specific compound, a resin composition containing the calcium hydroxide, and a molded article containing the resin composition. Further, the present invention also relates to a stabilizer for synthetic resins which comprises the calcium hydroxide.

BACKGROUND ART

Synthetic resins, halogen-containing resins in particular, are unstable against heat and light and may deteriorate with time or deteriorate during a crosslinking reaction or a molding process. Hence, a lead compound, an organotin compound, and a Cd/Ba-, Ba/Zn- or Ca/Zn-based composite organic acid salt have been used as a stabilizer therefor. However, the toxicity of these stabilizers and environmental pollution caused by these stabilizers have started to be acknowledged as problems. Therefore, various stabilizers comprising calcium hydroxide which is safer and less expensive as a main component have been developed for synthetic resins (refer to Patent Publications 1 and 2).

However, since the solubility of quick lime in water is high, calcium hydroxide is apt to undergo crystal growth, has a small specific surface area (refer to Patent Publication 3) and is limited in halogen capturing capability. Further, when a calcium hydroxide based stabilizer is added to a synthetic resin, the resulting synthetic resin has problems of poor thermal stability and very poor initial colorability as compared with when a lead compound or an organotin compound is added to a synthetic resin.

Despite these problems, since calcium hydroxide has excellent safety and is inexpensive, it is expected to be used as a stabilizer for a synthetic resin, and an improvement thereof has been desired.

(Patent Publication 1) JP-A 6-316662 (the term "JP-A" as used herein means an "unexamined published Japanese patent application")

(Patent Publication 2) JP-A 11-193336

(Patent Publication 3) JP-A 2001-123071

DISCLOSURE OF THE INVENTION

Thus, an object of the present invention is to provide calcium hydroxide having a large specific surface area and excellent capabilities of acid neutralization and halogen capturing.

Another object of the present invention is to provide a resin composition which is excellent in long-term thermal stability during the processing, initial colorability and capability of receiving an acid produced by heat or an electron beam during the secondary fabrication or crosslinking, and a molded article comprising the resin composition.

Still another object of the present invention is to provide a stabilizer for synthetic resins which contains calcium hydroxide having a large specific surface area and excellent capabilities of acid neutralization and halogen capturing.

The present inventor has found that calcium hydroxide having a very large specific surface area can be produced in the presence of at least one compound selected from the group consisting of a silicon-based compound, a phosphorus-based compound, an aluminum-based compound, an inorganic acid and an organic acid. The present invention has been completed based on this finding.

To be more specific, the present invention includes calcium hydroxide represented by the following formula (1):

$$Ca(OH)_{2-nx}(A^{n-})_x \quad (1)$$

wherein n represents an integer of 1 to 4, x represents a number of 0.001 to 0.2, and $A^{n-}$ represents an anion derived from at least one compound selected from the group consisting of a silicon-based compound, a phosphorus-based compound, an aluminum-based compound, an inorganic acid and an organic acid.

Further, the present invention also includes a resin composition comprising (i) 100 parts by weight of synthetic resin and (ii) 0.1 to 10 parts by weight of calcium hydroxide represented by the following formula (1):

$$Ca(OH)_{2-nx}(A^{n-})_x \quad (1)$$

(wherein n represents an integer of 1 to 4, x represents a number of 0.001 to 0.2, and $A^{n-}$ represents an anion derived from at least one compound selected from the group consisting of a silicon-based compound, a phosphorus-based compound, an aluminum-based compound, an inorganic acid and an organic acid.)

Further, the present invention also includes a molded article comprising the above resin composition.

In addition, the present invention also includes a stabilizer for synthetic resins which comprises a calcium hydroxide compound represented by the following formula (1):

$$Ca(OH)_{2-nx}(A^{n-})_x \quad (1)$$

(wherein n represents an integer of 1 to 4, x represents a number of 0.001 to 0.2, and $A^{n-}$ represents an anion derived from at least one compound selected from the group consisting of a silicon-based compound, a phosphorus-based compound, an aluminum-based compound, an inorganic acid and an organic acid.)

Effect of the Invention

The calcium hydroxide of the present invention has fine crystals due to inhibition of crystal growth during its production process. Accordingly, it has a large specific surface area, is highly active and has excellent capabilities of acid neutralization and halogen capturing. Hence, it can be suitably used as a stabilizer for synthetic resins.

The resin composition of the present invention and the molded article comprising the resin composition contain the above calcium hydroxide. Therefore, they are excellent in thermal stability, particularly long-term thermal stability, and initial colorability. Further, they have an excellent capability of receiving an acid produced by heat or an electron beam during the secondary fabrication or crosslinking.

The stabilizer for synthetic resins of the present invention provides excellent thermal stability and initial colorability to synthetic resins.

BEST MODE FOR CARRYING OUT THE INVENTION

Hereinafter, the present invention will be further described.

Calcium hydroxide of the present invention can be represented by the following formula (1).

$$Ca(OH)_{2-nx}(A^{n-})_x \quad (1)$$

In the above formula, n represents an integer of 1 to 4, x represents a number of 0.001 to 0.2, and $A^{n-}$ represents an anion derived from at least one compound (hereinafter may be referred to as "additive") selected from the group consisting of a silicon-based compound, a phosphorus-based compound, an aluminum-based compound, an inorganic acid and an organic acid. Therefore, n is the valence of anion, x is an anion content, and nx is their product.

Illustrative examples of a monovalent anion represented by $A^{n-}$(n=1) include $SiO(OH)_3^-$, $Al(OH)_4^-$, $Cl^-$, $NO_3^-$, $H_2PO_4^-$ and $C_6H_7O_7^-$. Illustrative examples of a divalent anion (n=2) include $SiO_2(OH)_2^{2-}$, $Si_2O_6(OH)_6^{2-}$, $HPO_4^{2-}$ and $C_6H_6O_7^{2-}$. Illustrative examples of a trivalent anion (n=3) include $PO_4^{3-}$ and $C_6H_5O_7^{3-}$. Illustrative examples of a tetravalent anion (n=4) include $SiO_4^{4-}$ and $Si_4O_8(OH)_4^{4-}$.

Of these, $SiO(OH)_3^-$, $SiO_2(OH)_2^{2-}$ and $Al(OH)_4^-$ are preferred.

As $A^{n-}$, a plurality of anions of different types may be contained in the compound represented by the formula (1) simultaneously. In this case, a total of products of the valences of the anions and the contents of the anions is represented by nx.

x is 0.001 to 0.2, preferably 0.005 to 0.15, more preferably 0.01 to 0.1.

In other words, the present invention includes calcium hydroxide formed of a solid solution with at least one compound selected from the group consisting of a silicon-based compound, a phosphorus-based compound, an aluminum-based compound, an inorganic acid and an organic acid.

The silicon-based compound is preferably at least one silicon-based compound selected from the group consisting of alkali silicate, a silicate, hydrated silicic acid, silicic acid anhydride, crystalline silicic acid (e.g., quartz), amorphous silica and an organosilicon-based compound. Silica (silicon dioxide) is particularly preferred. Preferred examples of the organosilicon-based compound include tetraethoxysilane, tetramethoxysllane, polymethoxysilane and a silane coupling agent.

The phosphorus-based compound is preferably at least one phosphorus-based compound selected from the group consisting of phosphoric acid, condensed phosphoric acid, polyphosphoric acid and their salts.

The aluminum-based compound is preferably at least one aluminum-based compound selected from the group consisting of an aluminum salt, crystalline aluminum hydroxide and amorphous aluminum hydroxide.

The inorganic acid is preferably at least one inorganic acid selected from the group consisting of hydrochloric acid, nitric acid and sulfuric acid.

The organic acid is preferably at least one organic acid selected from the group consisting of citric acid, tartaric acid, ethylenediamine tetraacetic acid, malic acid, succinic acid, and their salts.

The calcium hydroxide is natural lime or synthetic lime. The calcium hydroxide of the present invention preferably has a chlorine element content of not higher than 0.05 wt % and a sodium element content of not higher than 20 ppm. The sodium element content is measured by an atomic absorption method, and the chlorine element content is measured by an absorptiometric method.

The calcium hydroxide of the present invention has an average secondary particle diameter measured by a laser diffraction scattering method of 0.1 to 10 μm, preferably 0.1 to 7 μm, more preferably 0.5 to 7 μm. The calcium hydroxide of the present invention has a specific surface area measured by a BET method of 5 to 40 $m^2/g$, preferably 10 to 30 $m^2/g$.

(Production Method)

The calcium hydroxide of the present invention can be produced by:

(i) slaking-reacting calcium oxide in water, or (ii) reacting a water-soluble calcium salt with an alkali metal hydroxide, in the presence of at least one compound selected from the group consisting of a silicon-based compound, a phosphorus-based compound, an aluminum-based compound, an inorganic acid and an organic acid.

(Slaking Method)

That is, firstly, the calcium hydroxide of the present invention can be produced by a method described in Japanese Patent Application No. 2002-137581 (JP-A 2003-327427) applied by the present inventor. More specifically, the calcium hydroxide of the present invention can be produced by slaking-reacting quick lime (calcium oxide) in water containing at least one compound (additive) selected from the group consisting of a silicon-based compound, a phosphorus-based compound, an aluminum-based compound, an inorganic acid and an organic acid. Suitably, quick lime is fed into water of 10 to 60° C., preferably 30 to 60° C., which contains the additive under agitation to cause it to undergo a slaking reaction. The reaction temperature is increased by self-generating heat by addition of quick lime and reaches 90° C. or higher, for example. Calcium hydroxide having an average secondary particle diameter of 1.0 to 7 μm can be obtained by the slaking method.

(Reaction Method)

Secondly, the calcium hydroxide of the present invention can be produced by reacting an aqueous solution of a water-soluble calcium salt with an aqueous solution of an alkali metal hydroxide in the presence of an additive. More specifically, the calcium hydroxide of the present invention can be produced by reacting an aqueous solution of a water-soluble calcium salt such as calcium chloride or calcium nitrate with an aqueous solution of an alkali metal hydroxide such as sodium hydroxide or potassium hydroxide in the presence of at least one compound selected from the group consisting of a silicon-based compound, a phosphorus-based compound, an aluminum-based compound, an inorganic acid and an organic acid. The aqueous solution of the alkali metal hydroxide preferably has an alkali equivalent which is equal to or higher than a calcium equivalent (preferably 1.05 to 1.3-fold equivalent).

After the reaction, the obtained white precipitate is preferably aged under heating at about 60 to 150° C., preferably about 80 to 120° C., for 0.5 to 4 hours and surface-treated by an anionic surfactant or the like. Then, filtration, washing with water, drying, grinding, classification and the like can be selected as appropriate to produce the calcium hydroxide. The calcium hydroxide produced by the reaction method has an average secondary particle diameter of about 0.5 to 2 μm.

Thirdly, the calcium hydroxide compound of the present invention can also be obtained by adding at least one selected from the group consisting of a silicon-based compound, a phosphorus-based compound, an aluminum-based compound, an inorganic acid and an organic acid to a calcium hydroxide particle suspension obtained by adding quick lime to water to cause the quick lime to undergo a slaking reaction and then aging the resulting mixture.

The additive is preferably present in an amount of 0.01 to 7 wt %, preferably 0.05 to 7 wt %, more preferably 0.1 to 7 wt %, based on the calcium hydroxide to be produced. When the amount is smaller than 0.01 wt %, the specific surface area of the calcium hydroxide compound to be produced becomes small. Meanwhile, when the amount is larger than 7 wt %, the solid solution limit to calcium hydroxide is exceeded.

In these production methods, it is not revealed what effect of the additive increases the BET surface areas of calcium hydroxide particles. However, it is assumed that the increase in the BET surface area occurs because crystal growth is inhibited by the additive which acts as a crystal growth inhibitor and controls the solubility of calcium hydroxide.

Thus, it can also be said that the calcium hydroxide of the present invention is calcium hydroxide obtained by:

(i) slaking-reacting calcium oxide in water, or (ii) reacting a water-soluble calcium salt with an alkali metal hydroxide, in the presence of at least one compound selected from the group consisting of a silicon-based compound, a phosphorus-based compound, an aluminum-based compound, an inorganic acid and an organic acid.

(Aging)

Although calcium hydroxide having a large specific surface area can be obtained by the above method, calcium hydroxide of higher quality can be obtained by aging the reaction mixture after the reaction. The reaction mixture can be aged at 60 to 170° C., preferably 80 to 120° C., most preferably 90 to 100° C., for 5 minutes to 3 hours, preferably 10 minutes to 2 hours, more preferably 20 minutes to 1 hour.

(Grinding)

Further, after completion of the reaction or aging, the obtained calcium hydroxide can be ground in a suspension by grinding means such as a wet ball mill as required. Further, after drying, the obtained calcium hydroxide can be ground by use of an airflow classifier, an airflow grinder or the like. Thereby, particles having an average secondary particle diameter of smaller than 2 μm can be obtained.

(Surface Treatment)

The calcium hydroxide of the present invention can be surface-treated with a surface treating agent known per se as desired. The compatibility thereof with a resin or the like can be improved by the surface treatment.

Illustrative examples of the surface treating agent include (a) a higher fatty acid, (b) an alkali metal salt of a higher fatty acid, (c) a sulfuric ester of a higher alcohol, (d) an anionic surfactant, (e) a phosphoric ester, (f) a coupling agent (silane-, titanate- or aluminum-based), (g) a fatty acid ester of a polyhydric alcohol, (h) a sorbitan fatty acid ester, and (i) a compound selected from the group consisting of a silicon-based compound, a phosphorus-based compound, an aluminum-based compound, an inorganic acid and an organic acid.

Illustrative examples of surface treating agents which are preferably used include:

(a) higher fatty acids having 10 or more carbon atoms such as stearic acid, erucic acid, palmitic acid, lauric acid and behenic acid;

(b) alkali metal salts of the above higher fatty acids;

(c) sulfuric esters of higher alcohols such as stearyl alcohol and oleyl alcohol;

(d) anionic surfactants such as a sulfuric ester of a polyethylene glycol ether, an amide bond sulfuric ester, an ester bond sulfuric ester, an ester bond sulfonate, an amide bond sulfonate, an ether bond sulfonate, an ether bond alkylaryl sulfonate, an ester bond alkylaryl sulfonate and an amide bond alkylaryl sulfonate;

(e) phosphoric esters such as acid and alkali metal salts and amine salts of a mixture comprising orthophosphoric acid and a monoester and/or diester of oleyl alcohol, stearyl alcohol or the like;

(f) silane coupling agents such as vinyl ethoxysilane, vinyl-tris(2-methoxy-ethoxy)silane, γ-methacryloxypropyl trimethoxysilane, γ-aminopropyl trimethoxysilane, β-(3,4-epoxycyclohexyl)ethyl trimethoxysilane, γ-glycidoxypropyl trimethoxysilane and γ-mercaptopropyl trimethoxysilane; titanate-based coupling agents such as isopropyl triisostearoyl titanate, isopropyl tris(dioctyl pyrophosphate)titanate, isopropyl tris(N-aminoethyl-aminoethyl)titanate and isopropyl tridecyl benzenesulfonyl titanate; aluminum-based coupling agents such as acetalkoxy aluminum duisopropylate;

(g) fatty acid esters of polyhydric alcohols such as glycerine monostearate and glycerine monooleate, (h) sorbitan monostearate, and (i) silicon-based compounds, phosphorus-based compounds and aluminum-based compounds having $SiO(OH)_3^-$, $Al(OH)_4^-$, $Cl^-$, $NO_3^-$, $H_2PO_4^-$, $C_6H_7O_7^-$, $SiO_2(OH)_2^{2-}$, $Si_2O_6(OH)_6^{2-}$, $HPO_4^{2-}$, $C_6H_6O_7^{2-}$, $PO_4^{3-}$, $C_6H_5O_7^{3-}$, $SiO_4^{4-}$ or $Si_4O_8(OH)_4^{4-}$.

The calcium hydroxide particles can be surface-treated by a wet or dry process known per se. For example, in the wet process, a surface treating agent in a liquid or emulsion form is added to slurry of the calcium hydroxide particles and stirred mechanically to a sufficient extent at a temperature up to about 100° C. In the dry method, the calcium hydroxide particles are stirred by a mixer such as a Henschel mixer, a surface treating agent is added in a liquid, emulsion or solid form, and they are fully mixed with or without heating. The amount of the surface treating agent can be selected as appropriate. It is preferably not larger than about 10 wt % based on the weight of the calcium hydroxide particles.

The surface-treated calcium hydroxide particles can be formed into a final product form by selecting and performing means such as washing with water, dehydration, granulation, drying, grinding or classification as required.

<Resin Composition>

The resin composition of the present invention is a composition comprising 100 parts by weight of synthetic resin and 0.1 to 10 parts by weight, preferably 0.2 to 7 parts by weight, more preferably 0.5 to 3 parts by weight of calcium hydroxide represented by the above formula (1).

(Synthetic Resin)

The synthetic resin is any synthetic resin which is generally used as a molded article. Illustrative examples thereof include thermoplastic resins such as $C_2$ to $C_8$ olefin (α-olefin) polymers or copolymers, e.g., a polyethylene, polypropylene, ethylene/propylene copolymer, polybutene and poly.4-methylpentene-1, copolymers of these olefins and diene, ethylene-acrylate copolymer, polystyrene, ABS resin, AAS resin, AS resin, MBS resin, ethylene/vinyl chloride copolymer resin, ethylene/vinyl acetate copolymer resin, ethylene/vinyl chloride/vinyl acetate graft polymer resin, vinylidene chloride, polyvinyl chloride, chlorinated polyethylene, chlorinated polypropylene, vinyl chloride/propylene copolymer, vinyl acetate resin, phenoxyresin, polyacetal, polyamide, polyimide, polycarbonate, polysulfone, polyphenylene oxide, polyphenylene sulfide, polyethylene terephthalate, polybutylene terephthalate and methacrylic resin; thermosetting resins such as an epoxy resin, phenol resin, melamine resin, unsaturated polyester resin, alkyd resin and urea resin; and synthetic rubbers such as EPDM, butyl rubber, isoprene rubber, SBR, NBR, chlorosulfonated polyethylene, NIR, urethane rubber, butadiene rubber, acryl rubber, silicone rubber and fluorocarbon rubber.

The resin composition of the present invention can be produced by mixing these synthetic resins with the calcium hydroxide represented by the above formula (1) by means of a roll mill or the like.

(Hydrotalcite)

In addition to the calcium hydroxide represented by the formula (1), the resin composition of the present invention preferably contains 0.1 to 10 parts by weight, preferably 0.2 to 7 parts by weight, more preferably 0.5 to 3 parts by weight of hydrotalcite, based on 100 parts by weight of the synthetic resin. The hydrotalcite may be synthetic hydrotalcite or natural hydrotalcite.

The hydrotalcite is preferably one represented by the following formula (2).

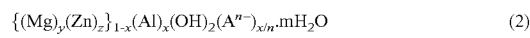

$$\{(Mg)_y(Zn)_z\}_{1-x}(Al)_x(OH)_2(A^{n-})_{x/n}.mH_2O \quad (2)$$

In the formula (2), $A^{n-}$ represents an n-valent anion. Specific examples thereof include $ClO_4^-$, $SO_4^{2-}$ and $CO_3^{2-}$. $CO_3^{2-}$ is preferred.

Further, in the above formula (2), (y+z) is 1, and x is a value which satisfies $0.1 \leq x \leq 0.5$, preferably $0.2 \leq x \leq 0.4$.

Further, y is a value which satisfies $0.5 \leq y \leq 1$, preferably $0.7 \leq y \leq 1$. Further, z is a value which satisfies $0 \leq z \leq 0.5$, preferably $0 \leq z \leq 0.3$. m is a value which satisfies $0 \leq m < 1$, preferably $0 \leq m \leq 0.7$.

The hydrotalcite preferably has an average secondary particle diameter measured by a laser diffraction scattering method of not larger than 2 μm. That is, most of particles in the hydrotalcite are preferably primary particles which have not undergone secondary agglomeration, more preferably particles having an average secondary particle diameter of 0.4 to 1.0 μm.

Further, the hydrotalcite preferably has a specific surface area measured by a BET method of 1 to 30 $m^2/g$, more preferably 5 to 20 $m^2/g$.

A method and conditions for producing the hydrotalcite are not particularly limited. Raw materials and production conditions for obtaining the hydrotalcite are known per se. Basically, the hydrotalcite can be produced in accordance with a known method (refer to JP-B 46-2280 (the term "JP-B" used herein means "Examined Japanese Patent Publication") and its corresponding U.S. Pat. No. 3,650,704; JP-B 47-32198 and its corresponding U.S. Pat. No. 3,879,525; JP-B 50-30039; JP-B 48-29477; JP-B 51-29129, for example).

As for raw materials used for mass-producing the hydrotalcite on an industrial scale, aluminum sulfate, aluminum chloride, sodium aluminate and aluminum hydroxide are suitable as an aluminum source; seawater, magnesium chloride (brine, ion brine), magnesium hydroxide and magnesium oxide are suitable as a magnesium source; and caustic soda for industrial use is suitable as an alkali source. Natural lime is not very preferable because the lime is difficult to purify. Further, sodium carbonate or carbon dioxide for industrial use can be used as a raw material for carbonate ions.

The hydrotalcite can be calcined before use. The calcination temperature is preferably 200° C. or higher, more preferably 230° C. or higher.

The hydrotalcite is preferably surface-treated. As surface treating agents therefor, the same surface treating agents as those for the calcium hydroxide represented by the formula (1) can be used in the same manner.

As for the ratio (by weight) between the calcium hydroxide (CH) represented by the formula (1) and the hydrotalcite (HT) which are mixed into the synthetic resin, CH/HT is preferably 1/9 to 9/1, more preferably 1/9 to 7/3, much more preferably 2/8 to 6/4. In the case of calcined hydrotalcite (HT), CH/HT is preferably 1/9 to 9/1, more preferably 2/8 to 8/2.

The total amount of the CH and HT contained in the synthetic resin is 0.1 to 10 parts by weight, preferably 0.2 to 7 parts by weight, more preferably 0.5 to 5 parts by weight, based on 100 parts by weight of the synthetic resin.

Further, when large quantities of iron compound, manganese compound and the like are contained in the calcium hydroxide and the hydrotalcite as stabilizers for synthetic resins, the thermal degradation resistance of a resin is degraded when they are added to the resin. Accordingly, the total content of the iron compound and the manganese compound is desirably not higher than 0.02 wt % in terms of metals (Fe+Mn).

The synthetic resin is preferably a polyvinyl chloride or fluorocarbon rubber, and the silicon-based compound is preferably silica.

The resin composition of the present invention may contain other conventional additives in addition to the above components. Illustrative examples of such additives include antioxidants, antistatic agents, pigments, foaming agents, plasticizers, fillers, reinforcers, organic halogen flame retardants, crosslinking agents, light stabilizers, ultraviolet absorbers, and lubricants.

<Molded Article>

The present invention includes a molded article comprising the above resin composition. Specific examples of the molded article include a tube, a pipe, a joint, a film, a cable covering material for electric cables, a window frame, a packaging container for food, a chassis or component for electronic equipment, and a component for automobiles.

<Stabilizer for Synthetic Resins>

The stabilizer for synthetic resins of the present invention comprises calcium hydroxide (CH) represented by the above formula (1). The present stabilizer preferably also comprises hydrotalcite (HT). The hydrotalcite is preferably one represented by the above formula (2).

As for the ratio (by weight) between CH and HT, CH/HT is preferably 1/9 to 9/1, more preferably 1/9 to 7/3, much more preferably 2/8 to 6/4. For calcined hydrotalcite (HT), CH/HT is preferably 1/9 to 9/1, more preferably 2/8 to 8/2.

EXAMPLES

Hereinafter, the present invention will be described in detail with reference to Examples. X-ray diffraction, a BET specific surface area and an average secondary particle diameter were measured in the following manner.

X-ray Diffraction:

X-ray diffraction was measured by an X-ray diffraction method using the RINT2200V X-ray diffractometer of Rigaku Corporation.

BET Specific Surface Area:

A BET specific surface area was measured by a nitrogen adsorption method using the full-automatic surface area measuring device MULTISORB 12 of Yuasa Ionics Inc.

Average Secondary Particle Diameter:

An average secondary particle diameter was measured by the MICROTRAC HRA type laser diffraction scattering method particle size distribution measuring device of Nikkiso Co., Ltd.

Examples 1 to 3

To a 3-liter beaker, 1.5 L of tap water and 0.3 wt % (0.9 g), 0.5 wt % (1.5 g) or 1.0 wt % (3.0 g) of hydrated silicon dioxide (CARPLEX #80, $SiO_2$ content: 95 wt %) of Shionogi & Co., Ltd. as a silicon-based compound were added based on calcium hydroxide to be produced. After the water temperature was elevated to about 60° C., 225 g of quick lime (CALCEED of Ube Material Industries, Ltd.) was added under agitation to cause a slaking reaction. Thereafter, the resulting mixture was agitated at 90° C. for 30 minutes (the reaction temperature was increased to 90° C. or higher by self-generating heat). After cooled, the resulting mixture was passed through a 200-mesh sieve, filtered, dehydrated, dried and ground. The X-ray diffraction pattern of the obtained powder showed only calcium hydroxide. Therefore, it was found that calcium hydroxide obtained from a solid solution of silicon dioxide was produced. The BET specific surface area, average secondary particle diameter, $A^{n-}$ and x of the solid solution calcium hydroxide are shown in Table 1.

Example 4

The procedure of Example 1 was repeated except that in place of the silicon-based compound, 2.5 wt % (7.5 g) of dried aluminum hydroxide gel (S-100, Al content: 28.6 wt %) of Kyowa Chemical Industry Co, Ltd. was used as an aluminum-based compound. The X-ray diffraction pattern of the obtained powder showed only calcium hydroxide. Therefore, it was found that calcium hydroxide formed of a solid solution with aluminum oxide was produced. The BET specific surface area, average secondary particle diameter, $A^{n-}$ and x of the solid solution calcium hydroxide are shown in Table 1.

Example 5

The procedure of Example 1 was repeated except that in place of the silicon-based compound, 5 wt % (15 g) of sodium polyphosphate (sodium polyphosphate: 26 wt %, sodium metaphosphate: 72 wt %, anhydrous sodium pyrophosphate: 2 wt %) of ORGANO CORPORATION was used as a phosphorus-based compound. The X-ray diffraction pattern of the obtained powder showed only calcium hydroxide. Therefore, it was found that calcium hydroxide obtained from a solid solution of phosphoric acid was produced. The BET specific surface area, average secondary particle diameter, $A^{n-}$ and x of the solid solution calcium hydroxide are shown in Table 1.

Examples 6 and 7

The procedure of Example 1 was repeated except that in place of the silicon-based compound, 20 ml of 1 mol/L nitric acid or 20 ml of 1 mol/L hydrochloric acid was used as an inorganic acid. The X-ray diffraction pattern of the obtained powder showed only calcium hydroxide. Therefore, it was found that calcium hydroxide formed of a solid solution with the inorganic acid was produced. The BET specific surface area, average secondary particle diameter, $A^{n-}$ and x of the solid solution calcium hydroxide are shown in Table 1.

Examples 8 to 11

The procedure of Example 1 was repeated except that in place of the silicon-based compound, 1.0 wt % (3 g), 2.0 wt % (6 g) or 3.0 wt % (9 g) of sodium citrate (content: 99 wt %) or 1.0 wt % (3 g) of tartaric acid (content: 97 wt %) was used as an organic acid or a salt thereof. The X-ray diffraction pattern of the obtained powder showed only calcium hydroxide. Therefore, it was found that calcium hydroxide formed of a solid solution with the organic acid was produced. The BET specific surface area, average secondary particle diameter, $A^{n-}$ and x of the solid solution calcium hydroxide are shown in Table 1.

Examples 12 and 13

A calcium hydroxide suspension obtained by adding 0.5 or 1.0 wt % of hydrated silicon dioxide of Example 1 was put in a 1-liter autoclave to be subjected to a hydrothermal treatment at 120° C. for 2 hours. After cooled, the resulting suspension was passed through a 200-mesh sieve, filtered, dehydrated, dried and ground. The BET specific surface area, average secondary particle diameter, $A^{n-}$ and x of the solid solution calcium hydroxide are shown in Table 1.

Examples 14 and 15

After a calcium hydroxide suspension obtained by adding 0.5 wt % of hydrated silicon dioxide of Example 1 or 2.0 wt % of sodium citrate of Example 5 was heated to 80° C., 5 wt % of sodium stearate solution (80° C.) was added under agitation to surface-treat the calcium hydroxide. After cooled, the resulting suspension was passed through a 200-mesh sieve, filtered, dehydrated, dried, and ground. The sodium stearate was added in such an amount that could cover the surface of the calcium hydroxide by a monomolecular layer. The BET specific surface area, average secondary particle diameter, $A^{n-}$ and x of the solid solution calcium hydroxide are shown in Table 1.

Example 16

A calcium hydroxide suspension obtained by adding 0.5 wt % of hydrated silicon dioxide of Example 1 was milled by using DYNO-MILL of SHINMARU ENTERPRISES CORPORATION as a wet ball mill at a glass bead diameter of 0.5 mm, a disk peripheral velocity of 10 m/s and a slurry feed rate of 250 L/h, filtered, dehydrated, dried and ground. The BET specific surface area, average secondary particle diameter, $A^{n-}$ and x of the solid solution calcium hydroxide are shown in Table 1.

Examples 17 to 19

The procedure of Example 1 was repeated except that aging (agitation at 90° C. for 30 minutes) after completion of the slaking reaction was not performed. The BET specific surface area, average secondary particle diameter, $A^{n-}$ and x of the obtained solid solution calcium hydroxide are shown in Table 1.

Example 20

500 L of water was poured into 2-$m^3$ reaction tank, and 427 L of 3 mol/l sodium hydroxide, 4.0 L of 6.6 mol/l sodium silicate No. 3 (water glass) as $SiO_2$, and 160 L of 4 mol/l calcium chloride were added in 30 minutes, respectively, and reacted at 40° C. for 30 minutes. The reaction product was filtered, dried and ground. The BET specific surface area, average secondary particle diameter, $A^{n-}$ and x of the obtained solid solution calcium hydroxide are shown in Table 1.

Comparative Example 1

To a 3-liter beaker, 1.5 L of tap water was added. After the water temperature was elevated to about 60° C., 225 g of quick lime was added under agitation to cause a slaking reaction Thereafter, the resulting mixture was agitated at 90° C. for 30 minutes (the reaction temperature was increased to 90° C. or higher by self-generating heat). After cooled, the mixture was passed through a 200-mesh sieve, filtered, dehydrated, dried and ground. The BET specific surface area and average secondary particle diameter of the obtained non-solid solution calcium hydroxide are shown in Table 1.

Comparative Example 2

To a 3-liter beaker, 1.5 L of tap water was added. After the water temperature was elevated to about 60° C., 225 g of quick lime was added under agitation to cause a slaking reaction. To the obtained calcium hydroxide solution, hydrated silicon dioxide (CARPLEX #80, $SiO_2$ content: 95 wt %) of Shionogi & Co., Ltd. was added in an amount corresponding to 0.5 wt % of calcium hydroxide yield as a silicon-based compound, and the mixture was agitated at 90° C. for 30 minutes. After cooled, the mixture was passed through a 200-mesh sieve, filtered, dehydrated, dried and ground. The BET specific surface area and average secondary particle diameter of the obtained non-solid solution calcium hydroxide are shown in Table 1.

In the following Examples, (1) a measurement of average secondary particle diameter, (2) a measurement of BET specific surface area, (3) an analysis of $SiO_2$, (4) an analysis of $Al_2O_3$ and (5) an analysis of metal were made in the following manner.

(1) Average Secondary Particle Diameter

An average secondary particle diameter is measured by a laser diffraction scattering method using MICROTRAC particle size analyzer SPA type [LEEDS & amp; product of NORTHRUP INSTRUMENTS]. More specifically, 700 mg of sample power is added to 70 ml of water and dispersed by ultrasound (product of NISSEI CO., LTD., MODEL US-300, current: 300 μA) for 3 minutes. Then, 2 to 4 ml of the dispersed solution is sampled and placed in a sample chamber of the above particle size analyzer which contains 250 ml of degassed water. After the analyzer is activated and the suspension is circulated for 8 minutes, particle size distribution is measured. Two measurements are made in total, and the arithmetic average of 50% cumulative secondary particle diameters obtained in the measurements is calculated and taken as the average secondary particle diameter of the sample.

TABLE 1

| | Type and Amount of Additive | Aging Conditions | BET Specific Surface Area ($m^2/g$) | Average Secondary Particle Diameter (μm) | Surface Treatment | $A^{n-}$ | x | Synthesis Method |
|---|---|---|---|---|---|---|---|---|
| Ex. 1 | Hydrated Silicon Dioxide, 0.3 wt % | 90° C., 0.5 hours | 28.3 | 3.50 | Not Performed | $SiO_2(OH)_2^{2-}$ | 0.006 | Slaking Method |
| Ex. 2 | Hydrated Silicon Dioxide, 0.5 wt % | 90° C., 0.5 hours | 30.8 | 3.31 | Not Performed | $SiO_2(OH)_2^{2-}$ | 0.01 | Slaking Method |
| Ex. 3 | Hydrated Silicon Dioxide, 1.0 wt % | 90° C., 0.5 hours | 35.8 | 2.95 | Not Performed | $SiO_2(OH)_2^{2-}$ | 0.02 | Slaking Method |
| Ex. 4 | Aluminum Gel, 2.5 wt % | 90° C., 0.5 hours | 15.0 | 6.32 | Not Performed | $Al(OH)_4^-$ | 0.05 | Slaking Method |
| Ex. 5 | Sodium Polyphosphate, 5.0 wt % | 90° C., 0.5 hours | 18.0 | 6.80 | Not Performed | $H_2PO_4^-$ | 0.1 | Slaking Method |
| Ex. 6 | 1 mol/1 Nitric Acid, 20 ml | 90° C., 0.5 hours | 8.6 | 3.83 | Not Performed | $NO_3^-$ | 0.016 | Slaking Method |
| Ex. 7 | 1 mol/1 Hydrochloric Acid, 20 ml | 90° C., 0.5 hours | 9.5 | 3.79 | Not Performed | $Cl^-$ | 0.01 | Slaking Method |
| Ex. 8 | Sodium Citrate, 1.0 wt % | 90° C., 0.5 hours | 30.0 | 2.38 | Not Performed | $C_6H_7O_7^-$ | 0.02 | Slaking Method |
| Ex. 9 | Sodium Citrate, 2.0 wt % | 90° C., 0.5 hours | 28.3 | 2.57 | Not Performed | $C_6H_7O_7^-$ | 0.04 | Slaking Method |
| Ex. 10 | Sodium Citrate, 3.0 wt % | 90° C., 0.5 hours | 22.0 | 2.71 | Not Performed | $C_6H_7O_7^-$ | 0.06 | Slaking Method |
| Ex. 11 | Tartaric Acid, 1.0 wt % | 90° C., 0.5 hours | 23.0 | 2.55 | Not Performed | $C_4H_5O_5^-$ | 0.02 | Slaking Method |
| Ex. 12 | Hydrated Silicon Dioxide, 0.5 wt % | 120° C., 2 hours | 31.0 | 3.50 | Not Performed | $SiO_2(OH)_2^{2-}$ | 0.01 | Slaking Method |
| Ex. 13 | Hydrated Silicon Dioxide, 1.0 wt % | 120° C., 2 hours | 36.0 | 3.00 | Not Performed | $SiO_2(OH)_2^{2-}$ | 0.02 | Slaking Method |
| Ex. 14 | Hydrated Silicon Dioxide, 0.5 wt % | 90° C., 0.5 hours | 28.0 | 3.15 | Performed | $SiO_2(OH)_2^{2-}$ | 0.01 | Slaking Method |
| Ex. 15 | Sodium Citrate, 2.0 wt % | 90° C., 0.5 hours | 26.0 | 2.80 | Performed | $C_6H_7O_7^-$ | 0.04 | Slaking Method |
| Ex. 16 | Hydrated Silicon Dioxide, 0.5 wt % | 90° C., 0.5 hours | 31.0 | 0.90 | Not Performed | $SiO_2(OH)_2^{2-}$ | 0.01 | Slaking Method |
| Ex. 17 | Hydrated Silicon Dioxide 0.3 wt % | — | 26.5 | 3.65 | Not Performed | $SiO_2(OH)_2^{2-}$ | 0.006 | Slaking Method |
| Ex. 18 | Hydrated Silicon Dioxide, 0.5 wt % | — | 29.0 | 3.42 | Not Performed | $SiO_2(OH)_2^{2-}$ | 0.01 | Slaking Method |
| Ex. 19 | Hydrated Silicon Dioxide, 1.0 wt % | — | 33.0 | 3.00 | Not Performed | $SiO_2(OH)_2^{2-}$ | 0.02 | Slaking Method |
| Ex. 20 | Sodium Silicate, 26.4 mol | — | 30.0 | 3.50 | Not Performed | $SiO(OH)_3^-$ | 0.066 | Reaction Method |
| C. Ex. 1 | Not Added | 90° C., 0.5 hours | 1.9 | 6.48 | Not Performed | — | — | Slaking Method |
| C. Ex. 2 | Hydrated Silicon Dioxide, 0.5 wt % | 90° C., 0.5 hours | 7.0 | 5.02 | Not Performed | — | — | Slaking Method |

Ex.: Example,
C. Ex.: Comparative Example (2) BET Method Specific Surface Area

A BET method specific surface area is measured in accordance with a liquid nitrogen adsorption method. That is, the BET method specific surface area is measured by use of a liquid nitrogen adsorption method device (NOVA2000 of Yuasa Ionics Inc.). 0.5 g of powder weighed accurately as a sample is placed in a measurement cell and pretreated under a vacuum degree of 10 mTrr or lower at 105° C. for 30 minutes (instrument: Flovac Degasser of Yuasa Ionics Inc.). After pretreatment, the cell is cooled and placed in a chamber of the measuring device to measure the specific surface area.

(3) Analysis of $SiO_2$ $SiO_2$ is analyzed by an absorptiometric method. More specifically, 0.5 g of powder weighed accurately as a sample is placed in a platinum crucible, and 2 g of boric acid and 3 g of anhydrous sodium carbonate are added thereto and mixed together. After molten at 950° C. for 2 hours, the resulting mixture is cooled and dissolved in 40 ml of diluted hydrochloric acid, and the amount of the solution is adjusted to 250 ml by adding ion-exchange water. 25 ml of the solution is sampled and transferred to a 100-ml measuring flask, 5 ml of ammonium molybdate solution (10% solution) is added thereto, and ion-exchange water is also added to adjust the amount of the solution to 100 ml to prepare a solution to be measured. Absorbance at 420 nm is measured by use of a spectrophotometer (double beam spectrophotometer 150-20 of Hitachi, Ltd.).

(4) Analysis of $Al_2O_3$ $Al_2O_3$ is measured by a chelating method. More specifically, 0.5 g of powder weighed accurately as a sample is placed in a 100-ml beaker, 20 ml of diluted hydrochloric acid and 15 ml of perchloric acid are added, and the mixture is heated at 150 to 200° C. for 30 minutes. After the mixture is heated, cooling water is added thereto, and insoluble materials are filtered out by use of filter paper for determination and washed. The filtrate and the wash liquid are combined and adjusted to exactly 250 ml to prepare a solution to be measured. 25 ml of the solution to be measured is sampled, and ion-exchange water is added thereto to adjust the pH to 3.0. An indicator Cu-PAN solution is added to the pH adjusted solution to be measured, and the resulting solution is titrated by use of a 0.01-mol/l-EDTA2Na solution while heated until boiling. The end point of titration is a point where the solution does not change to orange-yellow color even when heated for 1 minute or longer.

(5) Analysis of Metal 0.5 g of powder weighed accurately as a sample is placed in a 100-ml beaker, 10 ml of diluted hydrochloric acid is added, and the sample powder is dissolved under heating. After cooled, the mixture is transferred to a 100-ml measuring flask, and the amount of the solution is adjusted to 100 ml by adding ion-exchange water to prepare a solution to be measured. Absorbance at Mn=257.610 nm and Fe=259.940 nm is measured by use of an ICP emission spectrophotometer (SPS1500VR of Seiko Instruments Inc.).

Examples 21 to 25

To a 2-$m^3$ reaction tank, 360 L of 4N NaOH, water glass (398 g/L) in amounts shown in Table 2 and 165 L of 4 mol/L $CaCl_2$ were added, and they were reacted at 40° C. for 5 minutes. The obtained reaction products were filtered. dried and ground to obtain solid solution calcium hydroxides CH21 to CH25. The results of chemical analyses and measurements of physical properties of CH21 to CH25 are as shown in Table 3.

Examples 26 and 27

To a 2-$m^3$ reaction tank, 360 L of 4N NaOH, sodium aluminate (323 g/L) in amounts shown in Table 2 and 165 L of 4 mol/L $CaCl_2$ were added, and they were reacted at 40° C. for 5 minutes. The obtained reaction products were filtered, dried and ground to obtain solid solution calcium hydroxides CH26 and CH27. The results of chemical analyses and measurements of physical properties of CH26 and CH27 are as shown in Table 3.

Examples 28 to 30

To a 2-$m^3$ reaction tank, 1 $m^3$ of $H_2O$ and water glass (398 g/L) in amounts shown in Table 2 were added, and the internal temperature of the reaction tank was adjusted to 60° C. Then, 27 kg of quick lime was also added. By addition of quick lime, the temperature increased to about 90° C. by digestive heat. The mixture was allowed to react in the state for 30 minutes. The obtained reaction products were filtered, dried and ground to obtain solid solution calcium hydroxides CH28 to CH30. The results of chemical analyses and measurements of physical properties of CH28 to CH30 are as shown in Table 3.

Comparative Example 3

To a 2-$m^3$ reaction tank, 360 L of 4N NaOH and 165 L of $CaCl_2$ (4 mol/L) were added, and they were reacted at 40° C. for 5 minutes. The obtained reaction product was filtered, dried and ground to obtain non-solid solution calcium hydroxide CHCE3. The results of chemical analysis and measurements of physical properties of CHCE3 are as shown in Table 3.

TABLE 2

| | Additive upon Reaction | Amount of Additive |
|---|---|---|
| Example 21 | Water Glass | 0.6 L |
| Example 22 | Water Glass | 1.2 L |
| Example 23 | Water Glass | 3.6 L |
| Example 24 | Water Glass | 6.0 L |
| Example 25 | Water Glass | 8.4 L |
| Example 26 | Sodium Aluminate | 4.5 L |
| Example 27 | Sodium Aluminate | 7.6 L |
| Example 28 | Water Glass | 0.8 L |
| Example 29 | Water Glass | 2.4 L |
| Example 30 | Water Glass | 4.0 L |

TABLE 3

| | | Ex. or C. Ex. Nos. | | | | | | | |
|---|---|---|---|---|---|---|---|---|---|
| | | C. Ex. 3 | Ex. 21 | Ex. 22 | Ex. 23 | Ex. 24 | Ex. 25 | Ex. 26 | Ex. 27 |
| Amount Added to $Ca(OH)_2$ | $SiO_2$: wt % (Measured Value: wt %) | 0 | 0.5 (0.49) | 1.0 (1.0) | 3.0 (2.8) | 5 (4.5) | 7 (6.9) | — | — |
| | $Al_2O_3$: wt % (Measured Value: wt %) | — | — | — | — | — | — | 3 (2.9) | 5 (4.9) |
| Solid Solution $Ca(OH)_2$ | Average Secondary Particle Diameter (μm) | 1.2 | 0.5 | 0.7 | 0.9 | 1.9 | 2.0 | 1.6 | 1.4 |
| | BET ($m^2/g$) | 9.8 | 11.0 | 13.9 | 21.9 | 25.7 | 27.3 | 10.5 | 12.1 |
| | $A^{n-}$ | — | $SiO(OH)_3^-$ | $SiO(OH)_3^-$ | $SiO(OH)_3^-$ | $SiO(OH)_3^-$ | $SiO(OH)_3^-$ | $Al(OH)_4^-$ | $Al(OH)_4^-$ |
| | x | — | 0.01 | 0.02 | 0.06 | 0.1 | 0.14 | 0.06 | 0.1 |
| | No. | CHCE3 | CH21 | CH22 | CH23 | CH24 | CH25 | CH26 | CH27 |
| Synthesis Method | | Reaction Method | Reaction Method | Reaction Method | Reaction Method | Reaction Method | Reaction Method | Reaction Method | Reaction Method |

| | | Ex. Nos. | | |
|---|---|---|---|---|
| | | Ex. 28 | Ex. 29 | Ex. 30 |
| Amount Addedto $Ca(OH)_2$ | $SiO_2$: wt % (Measured Value: wt %) | 1.0 (1.0) | 3.0 (2.9) | 5.0 (4.9) |
| | $Al_2O_3$: wt % (Measured Value: wt %) | — | — | — |
| Solid Solution $Ca(OH)_2$ | Average Secondary Particle Diameter (μm) | 3.0 | 1.9 | 1.6 |
| | BET ($m^2/g$) | 33.0 | 36.0 | 38.0 |
| | $A^{n-}$ | $SiO(OH)_3^-$ | $SiO(OH)_3^-$ | $SiO(OH)_3^-$ |
| | x | 0.02 | 0.06 | 0.1 |
| | No. | CH28 | CH29 | CH30 |
| Synthesis Method | | Slaking Method | Slaking Method | Slaking Method |

Ex.: Example,
C. Ex.: Comparative Example

Examples 31 to 37 and Comparative Example 4

Resin Compositions

Resin compositions having the following compositions were prepared by use of the solid solution calcium hydroxide (CH21 to CH27) or non-solid solution calcium hydroxide CHCE3 obtained in Examples 21 to 27 and Comparative Example 3 as a stabilizer. Thermal stability was measured in the following manner. That is, the resin composition was kneaded by use of a roll mill at 180° C. for 5 minutes to prepare a 0.7-mm roll sheet. A sample piece having a size of 5 cm×8 cm was cut out of the sheet, placed in a gear oven heated at 180° C. and taken out of the oven every 10 minutes to evaluate its thermal stability. The evaluation was made based on the degree of deterioration of the resin indicated by coloration. The time required to reach a certain degree of blackness was measured, and the color at the first stage of thermal stability measurement was evaluated. The results are shown in Table 4.

| Composition | |
|---|---|
| polyvinyl chloride (polymerization degree: 700) | 100 PHR |
| zinc stearate | 0.3 PHR |
| stearoyl benzoyl methane | 0.2 PHR |
| stabilizer | 1.0 PHR |
| dipentaerythritol | 0.2 PHR |

Comparative Example 5

A resin composition similar to that of Example 31 was prepared by use of hydrated silicon dioxide (CARPLEX #80, $SiO_2$ content: 95 wt %) of Shionogi & Co, Ltd. as a heat stabilizer. and its thermal stability was measured. The results are shown in Table 4.

Comparative Example 6

50 kg of slaked lime and 1.5 kg of hydrated silicon dioxide powder (CARPLEX #80, $SiO_2$ content: 95%) of Shionogi & Co., Ltd. were mixed together by use of a V blender for 2 hours to prepare a test sample. A resin composition similar to that of Example 31 was prepared by use of the test sample, and its thermal stability was measured. The results are shown in Table 4.

TABLE 4

| Resin Compositions | | | | | |
|---|---|---|---|---|---|
| Number | No. of Solid Solution $Ca(OH)_2$ used | Additive Solid-Solubilized in Calcium Hydroxide | Amount of Additive to Calcium Hydroxide (wt %) | Color at the first stage of Thermal Stability measurement* | Time to Blacken** |
| C. Ex. 4 | CHCE3 | — | — | ++++ | 100 |
| Ex. 31 | CH21 | Silicon Dioxide | 0.5 | ++ | 114 |
| Ex. 32 | CH22 | Silicon Dioxide | 1.0 | + | 129 |
| Ex. 33 | CH23 | Silicon Dioxide | 3.0 | + | 157 |
| Ex. 34 | CH24 | Silicon Dioxide | 5.0 | + | 143 |
| Ex. 35 | CH25 | Silicon Dioxide | 7.0 | ++ | 143 |
| Ex. 36 | CH26 | Aluminum Oxide | 3.0 | + | 129 |
| Ex. 37 | CH27 | Aluminum Oxide | 5.0 | + | 129 |
| C. Ex. 5 | — | — | — | Black | Unmeasurable |
| C. Ex. 6 | — | Silicon Dioxide | 3.0 | ++++ | 90 |

Ex.: Example,
C. Ex.: Comparative Example
*Color at the first stage of Thermal Stability measurement: "colorless and transparent" was rated as "+", "pale yellow and transparent" was rated as "++++", and differences in color therebetween were expressed by the number of "+".
**Time to Blacken: Time to blacken in Comparative Example 4 was set at 100.

Example 38

Surface Treatment

The solid solution calcium hydroxide (CH23) obtained in Example 23 was aged under heating at 60° C. for 30 minutes. Thereafter, 5 L of NaOH and 20 L of $H_2O$ were added to 1 kg of surface treating agents A, B, J, L2 or L1 shown in Table 5 and agitated. The resulting mixtures were added to the aged CH23 and heated to 60° C. to surface-treat the CH23. Thereby, surface-treated solid solution calcium hydroxide CH23-A, CH23-B, CH23-J, CH23-L2 and CH23-L1 were prepared. However, in the case of the CH23-L2, 1 kg of the surface treating agent was added to the aged CH23.

Resin Compositions were prepared in the same manner as in Example 31 except that these surface-treated CH23 were used, and the thermal stability and initial coloration of the compositions were tested. The results are shown in Table 6. As shown in Table 6, there are no differences in the results caused by use of the different surface treating agents.

TABLE 5

| No. of Solid Solution $Ca(OH)_2$ | Name (Abbreviation) of Surface Treating Agent |
|---|---|
| CH23-A | Stearic Acid (A) |
| CH23-B | Oleic Acid (B) |
| CH23-J | Phosphoric Ester (J) |
| CH23-L2 | Vinylsilane (L2) |
| CH23-L1 | Lauric Acid (L1) |

TABLE 6

| No. of Solid Solution $Ca(OH)_2$ | Color at the first stage of Thermal Stability measurement | Time to Blacken (minutes) |
|---|---|---|
| CH23-A | Colorless and Transparent | 55 |
| CH23-B | Colorless and Transparent | 55 |
| CH23-J | Colorless and Transparent | 55 |
| CH23-L2 | Colorless and Transparent | 55 |
| CH23-L1 | Colorless and Transparent | 55 |

Example 39

Preparation of Solid Solution Calcium Hydroxide

To a 2-$m^3$ reaction tank, 360 L of 4N NaOH, water glass (398 g/L) in the amount shown in Table 7 and 165 L of 4 mol/L $CaCl_2$ were added, and they were reacted at 40° C. for 5 minutes. The obtained reaction product was filtered, dried and ground to obtain solid solution calcium hydroxide CH39. The results of chemical analysis and measurements of physical properties of CH39 are as shown in Table 8.

Examples 40 and 41

Solid solution calcium hydroxides CH40 and CH41 were prepared in the same manner as in Example 39 except that synthetic amorphous silica ($SiO_2$: 93 wt %) was used in amounts shown in Table 7 in place of water glass. The results of chemical analyses and measurements of physical properties of CH40 and C41 are as shown in Table 8.

Examples 42 and 43

Solid solution calcium hydroxides CH42 and CH43 were prepared in the same manner as in Example 39 except that tetraethoxysilane ($SiO_2$: 28 wt %) was used in amounts shown in Table 7 in place of water glass. The results of chemical analyses and measurements of physical properties of CH42 and C43 are as shown in Table 8.

TABLE 7

| No. | Additive upon Reaction | Amount of Additive |
|---|---|---|
| CH39 | Water Glass | 0.06 L |
| CH40 | Synthetic Amorphous Silica | 0.53 kg |
| CH41 | Synthetic Amorphous Silica | 1.05 kg |
| CH42 | Tetraethoxysilane | 1.8 L |
| CH43 | Tetraethoxysilane | 2.7 L |

TABLE 8

| | Amount Added to $Ca(OH)_2$ | Ex. 39 | Ex. 40 | Ex. 41 | Ex. 42 | Ex. 43 |
|---|---|---|---|---|---|---|
| | $SiO_2$: wt % | 0.05 | 1.0 | 2.0 | 1.0 | 1.5 |
| | (Measured Value: wt %) | (0.1) | (0.9) | (1.7) | (0.9) | (1.4) |
| | No. of Solid Solution $Ca(OH)_2$ | CH39 | CH40 | CH41 | CH42 | CH43 |
| | $A^{n-}$ | $SiO(OH)_3^-$ | $SiO(OH)_3^-$ | $SiO(OH)_3^-$ | $SiO_4^-$ | $SiO_4^-$ |
| | x | 0.001 | 0.02 | 0.04 | 0.02 | 0.03 |
| $SiO_2$ Solid-Solubilized $Ca(OH)_2$ | Average Secondary Particle Diameter (μm) | 1.2 | 1.09 | 1.7 | 0.8 | 0.8 |
| | BET ($m^2/g$) | 11.5 | 15.5 | 20.7 | 16.1 | 19.8 |
| | Synthesis Method | Reaction Method | Reaction Method | Reaction Method | Reaction Method | Reaction Method |

Ex.: Example

Reference Example 1

Preparation of HT1

Purified brine ($MgCl_2$=312.1 g/L) was transferred to a concentration adjusting tank, and aluminum sulfate ($Al_2O_3$=106.8 g/L) was added to prepare amixed solution (A) having an Mg concentration of 1.95 mol/L and an Al concentration of 0.847 mol/L. Then, caustic soda (48.7%) was transferred to another concentration adjusting tank, and sodium carbonate powder ($Na_2CO_3$=99.9%) and water were added to prepare an aqueous solution (B) containing 3 mol/L of NaOH and 0.23 mol/L of $Na_2CO_3$.

To a reaction tank containing water, 1.18 L of the mixed solution (A) and 2.2 L of the aqueous solution (B) were added simultaneously under agitation such that the residence time became 60 minutes, thereby obtaining reaction slurry of hydrotalcite. 800 L of the reaction slurry was sampled and retained in an autoclave under agitation at 170° C. for 6 hours to age the reaction slurry under heating. After cooled, the slurry was transferred to a surface treatment tank and heated to 80° C. under agitation, 2 kg of sodium stearate ($C_{17}H_{36}COONa$=93.4%) dissolved in 50 L of hot water of 80° C. in advance was added gradually, and the resulting mixture was agitated for 30 minutes to complete the surface treatment. The solids were separated by filtration, washed, dried by a hot-air dryer, milled by a hammer mill and taken as a sample.

As a result of analysis of the obtained HT1, its composition formula was found to be $Mg_{0.7}Al_{0.3}(OH)_2(CO_3)_{0.15}.0.5H_2O$. The results of chemical analysis and measurements of physical properties are shown in Table 9.

Reference Example 2

Preparation of HT2

The procedure of Reference Example 1 was repeated except that ion brine and zinc chloride were used as raw materials in place of purified brine. More specifically, ion brine ($MgCl_2$=168.2 g/L) was transferred to a concentration adjusting tank, and zinc chloride ($ZnCl_2$=572.7 g/L) and aluminum sulfate ($Al_2O_3$=106.8 g/L) were added to prepare a mixed solution having an Mg concentration of 1.05 mol/L, a Zn concentration of 0.42 mol/L and an Al concentration of 0.63 mol/L. A calcium sulfate precipitate produced in the mixing tank was removed by filtration, thereby obtaining a solution (A). Then, caustic soda (NaOH=48.7%) was transferred to another concentration adjusting tank, and sodium carbonate powder ($Na_2CO_3$=99.9%) and water were added to prepare an aqueous solution (B) containing 3 mol/L of NaOH and 0.225 mol/L of $Na_2CO_3$.

To a reaction tank containing water, 1 L of the solution (A) and 1.4 L of the solution (B) were added simultaneously under agitation such that the residence time became 60 minutes, thereby obtaining reaction slurry of HT. 800 L of the reaction slurry was sampled and kept in an autoclave under agitation at 140° C. for 6 hours to age it under heating. After cooled, the slurry was transferred to a surface treatment tank and heated to 80° C. under agitation, 1.3 kg of sodium stearate dissolved in 50 L of hot water of 80° C. in advance was added gradually, and the resulting mixture was agitated for 30 minutes to complete the surface treatment. The solids were separated by filtration, washed, re-emulsified, spray-dried, and taken as a sample.

As a result of analysis of synthesis of the obtained HT2, its composition formula was found to be $Mg_{0.5}Zn_{0.2}Al_{0.3}(OH)_2(CO_3)_{0.15}.0.55H_2O$. The results of chemical analysis and measurements of physical properties are shown in Table 9.

Reference Example 3

Preparation of HT3

The hydrotalcite compound HT1 obtained in Reference Example 1 was calcined at 240° C. to prepare a hydrotalcite compound HT3. The results of chemical analysis and measurements of physical properties are shown in Table 9.

Reference Example 4

Preparation of HT4

The HT2 obtained in Reference Example 2 was calcined at 240° C. to prepare a hydrotalcite compound HT4. The results of chemical analysis and measurements of physical properties are shown in Table 9.

TABLE 9

| | R. Ex. 1 | R. Ex. 2 | R. Ex. 3 | R. Ex. 4 |
|---|---|---|---|---|
| No. of Hydrotalcite | HT1 | HT2 | HT3 | HT4 |
| BET Method Specific Surface Area ($m^2/g$) | 10.4 | 7.1 | 9.4 | 8.0 |
| Average Secondary Particle Diameter (μm) | 0.4 | 0.5 | 0.4 | 0.7 |
| Fe (wt %) | 0.0019 | 0.0072 | 0.0030 | 0.0072 |
| Mn (wt %) | 0.0004 | 0.0004 | 0.0004 | 0.0003 |

R. Ex.: Reference Example

Examples 44 to 61 and Comparative Example 7

Resin Compositions

Resin compositions having the following composition (A) were prepared by use of the solid solution calcium hydroxides (CH39 and CH25) obtained in Examples 39 and 25, the hydrotalcites (HT1 and HT2) obtained in Reference Examples 1 and 2 and the non-solid solution calcium (CHCE3) obtained in Comparative Example 3 as stabilizers. The resin composition was kneaded by use of rolls at 180° C. for 5 minutes to prepare a 0.7-mm roll sheet. The compositions of the stabilizers are shown in Table 10.

A sample piece having a size of 5 cm×8 cm was cut out of the sheet, placed in a gear oven heated at 190° C. and taken out of the oven every 10 minutes to evaluate its thermal stability. The evaluation was made based on the degree of deterioration of the resin indicated by coloration. The time required to reach a certain degree of blackness was measured, and the color at the first stage of thermal stability measurement was evaluated. The results are shown in Table 10.

| Composition (A) | |
|---|---|
| polyvinyl chloride (polymerization degree: 700) | 100 PHR |
| zinc stearate | 0.3 PHR |
| stearoyl benzoyl methane | 0.2 PHR |
| dipentaerythritol | 0.2 PHR |
| stabilizer | 1.0 PHR |

Examples 62 to 84 and Comparative Example 8

Resin Compositions

Resin compositions having the following composition (B) were prepared by use of the solid solution calcium hydroxides (CH23, CH26 and CH29) obtained in Examples 23, 26 and 29, the hydrotalcite compounds (HT1 to HT4) obtained in Reference Examples 1 to 4 and the non-solid solution calcium (CHCE3) obtained in Comparative Example 3 as stabilizers. The resin composition was kneaded by use of rolls at 180° C. for 5 minutes to prepare a 0.7-mm roll sheet. The thermal stability of the sheet was evaluated in the same manner as in Example 44. The compositions of the stabilizers and the results are shown in Table 11.

| Composition (B) | |
|---|---|
| polyvinyl chloride (polymerization degree: 1000) | 100 PHR |
| dibenzoylmethane | 0.1 PHR |
| dipentaerythritol | 0.2 PHR |
| D xyol G32 | 0.2 PHR |
| zinc stearate | 0.8 PHR |
| calcium stearate | 0.4 PHR |
| METABLEN P-501 | 0.5 PHR |
| CCR | 4.0 PHR |
| stabilizer | 1.0 PHR |

TABLE 10

| | Composition of Stabilizer (Weight Ratio) Ex. No. | | | | | | | | | | | | | | | | | | |
|---|---|---|---|---|---|---|---|---|---|---|---|---|---|---|---|---|---|---|---|
| | C. Ex. 7 | 44 | 45 | 46 | 47 | 48 | 49 | 50 | 51 | 52 | 53 | 54 | 55 | 56 | 57 | 58 | 59 | 60 | 61 |
| Non-Solid Solution Calcium Hydroxide (CHCE3) | 100 | | | | | | | | | | | | | | | | | | |
| Solid Solution Calcium Hydroxide (CH39) | | 100 | | | | 95 | 90 | 80 | 50 | 40 | 30 | 20 | 10 | 5 | 90 | 50 | 10 | | |
| Solid Solution Calcium Hydroxide (CH25) | | | 100 | | | | | | | | | | | | | | | 50 | 50 |
| Hydrotalcite (HT1) | | | | 100 | | 5 | 10 | 20 | 50 | 60 | 70 | 80 | 90 | 95 | | | | 50 | |
| Hydrotalcite (HT2) | | | | | 100 | | | | | | | | | | 10 | 50 | 90 | | 50 |
| Color at the first stage of Thermal Stability measurement* | ++++ | +++ | +++ | ++ | + | +++ | ++ | ++ | + | + | + | + | + | + | + | + | + | + | + |
| Time to Blacken** | 100 | 100 | 100 | 125 | 120 | 105 | 110 | 120 | 150 | 150 | 200 | 150 | 150 | 150 | 120 | 150 | 100 | 150 | 150 |

C. Ex.: Comparative Example

*Color at the first stage of Thermal Stability measurement: "colorless and transparent" was rated as "+", "pale yellow and transparent" was rated as "++++", and differences in color therebetween were expressed by the number of "+".

**Time to Blacken: Time to blacken in Example 44 was set at 100.

TABLE 11

| | Composition of Stabilizer (Weight Ratio) Ex. No. | | | | | | | | | | | |
|---|---|---|---|---|---|---|---|---|---|---|---|---|
| | C. Ex. 8 | 62 | 63 | 64 | 65 | 66 | 67 | 68 | 69 | 70 | 71 | 72 |
| Non-Solid Solution Calcium Hydroxide (CHCE3) | 100 | | | | | | | | | | | |
| Solid Solution Calcium Hydroxite (CH23) | | 100 | | | | | 80 | 60 | 50 | 40 | 20 | 80 |
| Solid Solution Calcium Hydroxide (CH26) | | | | | | | | | | | | |
| Calcium Hydroxide Compound (CH29) | | | | | | | | | | | | |
| Hydrotalcite (HT1) | | | 100 | | | | 20 | 40 | 50 | 60 | 80 | |
| Hydrotalcite (HT2) | | | | 100 | | | | | | | | 20 |
| Hydrotalcite (HT3) | | | | | 100 | | | | | | | |
| Hydrotalcite (HT4) | | | | | | 100 | | | | | | |
| Color at the first stage of Thermal Stabilizer measurement* | ++++ | +++ | ++ | + | ++ | +++ | +++ | + | + | + | + | + |
| Time to Blacken** | 80 | 100 | 100 | 100 | 120 | 40 | 100 | 110 | 120 | 110 | 110 | 90 |
| | **Composition of Stabilizer (Weight Ratio) Ex. No.** | | | | | | | | | | | |
| | 73 | 74 | 75 | 76 | 77 | 78 | 79 | 80 | 81 | 82 | 83 | 84 |
| Non-Solid Solution Calcium Hydroxide (CHCE3) | | | | | | | | | | | | |
| Solid Solution Calcium Hydroxide (CH23) | 60 | 50 | 40 | 20 | 80 | 50 | 20 | 80 | 50 | 20 | | |
| Solid Solution Calcium Hydroxide (CH26) | | | | | | | | | | | 50 | |
| Calcium Hydroxide Compound (CH29) | | | | | | | | | | | | 50 |
| Hydrotalcite (HT1) | | | | | | | | | | | 50 | 50 |
| Hydrotalcite (HT2) | 40 | 50 | 60 | 80 | | | | | | | | |
| Hydrotalcite (HT3) | | | | | 20 | 50 | 80 | | | | | |
| Hydrotalcite (HT4) | | | | | | | | 20 | 50 | 80 | | |
| Color at the first stage of Thermal Stabilizer measurement* | + | ++ | ++ | ++ | + | ++ | ++ | ++ | ++ | ++ | + | + |
| Time to Blacken** | 100 | 100 | 100 | 100 | 130 | 110 | 100 | 70 | 90 | 100 | 130 | 130 |

Ex.: Example,

C. Ex.: Comparative Example

*Color at the first stage of Thermal Stability measurement: "colorless and transparent" was rated as "+", "pale yellow and transparent" was rated as "++++", and differences in color therebetween were expressed by the number of "+".

**Time to Blacken: Time to blacken in Example 62 was set at 100.

Examples 85 to 94 and Comparative Example 9

Resin Compositions

Resin compositions having the following composition (C) were prepared by use of the solid solution calcium hydroxides (CH22, CH40 and CH42) obtained in Examples 22, 40 and 42, the hydrotalcite (HT1) obtained in Reference Example 1 and the non-solid solution calcium (CHCE3) obtained in Comparative Example 3 as stabilizers. The resin composition was kneaded by use of rolls at 180° C. for 5 minutes to prepare a 0.7-mm roll sheet. The thermal stability of the sheet was evaluated in the same manner as in Example 44. The compositions of the stabilizers and the results are shown in Table 12.

| Composition (C) | |
|---|---|
| polyvinyl chloride (polymerization degree: 1000) | 100 PHR |
| dibenzoylmethane | 0.1 PHR |
| dipentaerythritol | 0.2 PHR |
| D xyol G32 | 0.2 PHR |
| zinc stearate | 0.6 PHR |
| calcium stearate | 0.2 PHR |
| heavy calcium carbonate | 3.0 PHR |
| stabilizer | 0.5 PHR |

TABLE 12

| | Composition of Stabilizer (Weight Ratio) Ex. No. | | | | | | | | | | |
|---|---|---|---|---|---|---|---|---|---|---|---|
| | C. Ex. 9 | 85 | 86 | 87 | 88 | 89 | 90 | 91 | 92 | 93 | 94 |
| Non-Solid Solution Calcium Hydroxide (CHCE3) | 100 | | | | | | | | | | |
| Solid Solution Calcium Hydroxide (CH22) | | 100 | | | 80 | 60 | 50 | 40 | 20 | | |
| Solid Solution Calcium Hydroxide (CH40) | | | 100 | | | | | | | | 50 |
| Solid Solution Calcium Hydroxide (CH42) | | | | 100 | | | | | | 50 | |
| Hydrotalcite (HT1) | | | | | 20 | 40 | 50 | 60 | 80 | 50 | 50 |
| Color at the first stage of Thermal Stabilizer measurement* | ++++ | +++ | +++ | +++ | ++ | ++ | + | + | + | + | + |
| Time to Blacken** | 100 | 100 | 100 | 100 | 130 | 130 | 130 | 130 | 130 | 150 | 130 |

Ex.: Example,

C. Ex.: Comparative Example

*Color at the first stage of Thermal Stability measurement: "colorless and transparent" was rated as "+", "pale yellow and transparent" was rated as "++++", and differences in color therebetween were expressed by the number of "+".

**Time to Blacken: Time to blacken in Example 85 was set at 100.

Example 95

Resin compositions having the composition (B) were prepared by use of the CH23-A, CH23-B, CH23-J, CH23-L2 and CH23-L1 prepared in Example 38 and the hydrotalcite (HT-1) obtained in Reference Example 1 in a ratio (by weight) of 1:1 as stabilizers. The resin composition was kneaded by use of rolls at 180° C. for 5 minutes to prepare a 0.7-mm roll sheet. The thermal stability of the sheet was evaluated in the same manner as in Example 44. The results are shown in Table 13.

TABLE 13

| Experiment No. | No. of solid Solution $Ca(OH)_2$ | Hydrotalcite | Color at the first stage of Thermal Stability measurement | Time to Blacken (minutes) |
|---|---|---|---|---|
| A | CH23-A | HT1 | Colorless and Transparent | 150 |
| B | CH23-B | HT1 | Colorless and Transparent | 150 |
| J | CH23-J | HT1 | Colorless and Transparent | 150 |
| L2 | CH23-L2 | HT1 | Colorless and Transparent | 150 |
| L1 | CH23-L1 | HT1 | Colorless and Transparent | 150 |

Examples 96 to 98 and Comparative Example 10

Fluorocarbon rubber compositions having the following composition were prepared by use of water-cooled rolls and the solid solution calcium hydroxide (CH23 to CH25) obtained in Examples 23 to 25 and the non-solid solution calcium hydroxide (CHCE3) obtained in Comparative Example 3 as stabilizers. Primary vulcanization was conducted at 170° C. for 15 minutes. Then, secondary vulcanization was conducted at 230° C. for 24 hours, and physical properties were measured. The results of the measurements are shown in Table 14.

| Composition | |
|---|---|
| fluorocarbon rubber DAI-EL G701 (product of Daikin Industries, Ltd.) | 100 phr |
| MT BLACK Cancarb N-990 (product of Cancarb Co., Ltd., Canada) | 20 phr |

-continued

| Composition | |
|---|---|
| MgO MA-150 (product of Kyowa Chemical Industry Co., Ltd.) | 3 phr |
| stabilizer | 6 phr |

TABLE 14

| | | Ex. 96 | Ex. 97 | Ex. 98 | C. Ex. 10 |
|---|---|---|---|---|---|
| | | Ex. or C. Ex. Nos. | | | |
| Stabilizer | | Solid Solution Calcium Hydroxide CH23 | Solid Solution Calcium Hydroxide CH24 | Solid Solution Calcium Hydroxide CH25 | Non-Solid Solution Calcium Hydroxide CHCE3 |
| Curast; 170° C., 15 min | ML (kg · f · cm) | 1.4 | 1.5 | 1.5 | 1.5 |
| | MH (kg · f · cm) | 18.5 | 18.0 | 17.0 | 19.5 |
| | Ts2 (min) | 4.5 | 4.9 | 4.5 | 4.1 |
| | Tc10 (min) | 4.7 | 4.6 | 5.0 | 4.0 |
| | Tc50 (min) | 5.0 | 5.4 | 5.8 | 4.8 |
| | Tc90 (min) | 6.2 | 6.9 | 6.6 | 5.3 |
| | Tc95 (min) | 7.1 | 7.5 | 7.3 | 7.3 |
| Tensile Strength (After Secondary Vulcanization) | M100 (100% Tensile Stress, kg · f/cm$^2$) | 53 | 52 | 50 | 62 |
| | TB (Tensile Strength, kg · f/cm$^2$) | 150 | 160 | 183 | 163 |
| | EB (Elongation, %) | 200 | 220 | 240 | 180 |
| | Hardness Hs | 73 | 73 | 72 | 75 |
| Compression Set 225° C., 24 hrs | | 14 | 13 | 12 | 18 |

Ex.: Example,
C. Ex.: Comparative Example
Curast: Measured in accordance with JIS K6300
Tensile Strength: Measured in accordance with JIS K6251
Hardness: Measured in accordance with JIS K6262
Compression Set: Measured in accordance with JIS K6262

The calcium hydroxide of the present invention is useful as a stabilizer for synthetic resins, e.g., as an acid neutralizer or a halogen capturing agent. Further, the resin composition of the present invention can be applied to various molding fields because it has excellent thermal stability and initial colorability.

The invention claimed is:

1. A resin composition comprising:

(i) 100 parts by weight of synthetic resin, (ii) 0.1 to 10 parts by weight of calcium hydroxide produced by reacting an aqueous solution of a water-soluble calcium salt with an aqueous solution of an alkali metal hydroxide in the presence of an organosilicon-based compound, wherein the water-soluble calcium salt is calcium chloride or calcium nitrate, and wherein the alkali metal hydroxide is sodium hydroxide or potassium hydroxide, wherein the calcium hydroxide:

(a) is represented by the following formula (1):

$$Ca(OH)_{2-nx}(A^{n-})_x \quad (1)$$

wherein n is 4, x represents a number of 0.001 to 0.2, and $A^{n-}$ is $SiO_4^{4-}$, (b) has an average secondary particle diameter, measured by a laser diffraction scattering method, of 0.1 to 7 μm, and (c) has a BET method specific surface area of 5 to 40 $m^2/g$, and (iii) 0.1 to 10 parts by weight of hydrotalcite represented by the following formula (2):

$$\{(Mg)_y(Zn)_z\}_{1-x}(Al)_x(OH)_2(A^{n-})_{x/n}.mH_2O \quad (2)$$

wherein $A^{n-}$ represents $ClO_4^-$, $SO_4^{2-}$, $CO_3^{2-}$ or a mixture thereof, n is 1 or 2, and x, y, z and m satisfy y+z=1, 0.1<x<0.5, 0.5<y<1, 0≤z<0.5 and 0<m<1).

2. The resin composition of claim 1, wherein the synthetic resin is a polyvinyl chloride or fluorocarbon rubber.

3. The resin composition of claim 1, wherein the weight ratio CH/HT of (ii) the calcium hydroxide (CH) to (iii) the hydrotalcite (HT) is 1/9 to 9/1.

4. The resin composition of claim 1, wherein the hydrotalcite is a product calcined at 200° C. or higher.

5. The resin composition of claim 1, wherein the hydrotalcite is surface-treated with at least one surface treating agent selected from the group consisting of (a) a higher fatty acid, (b) an alkali metal salt of a higher fatty acid, (c) a sulfuric ester of a higher alcohol, (d) an anionic surfactant, (e) a phosphoric ester, (f) a silane-, titanate- or aluminum-based coupling agent, (g) a fatty acid ester of a polyhydric alcohol and (h) a silicon-based compound, a phosphorus-based compound, an aluminum-based compound, an inorganic acid and an organic acid.

6. A molded article comprising the resin composition of claim 1.

7. The resin composition of claim 1, wherein the calcium hydroxide is surface-treated with at least one surface treating agent selected from the group consisting of (a) a higher fatty acid, (b) an alkali metal salt of a higher fatty acid, (c) a sulfuric ester of a higher alcohol, (d) an anionic surfactant, (e) a phosphoric ester, (f) a silane-, titanate- or aluminum-based coupling agent, (g) a fatty acid ester of a polyhydric alcohol and (h) a silicone-based compound, a phosphorus-based compound, an aluminum-based compound, an inorganic acid and an organic acid.

8. The resin composition of claim 1, wherein the X-ray diffraction pattern of calcium hydroxide shows only the pattern of calcium hydroxide.

9. The resin composition of claim 1, wherein the organosilicon-based compound is at least one compound selected from the group consisting of tetraethoxysilane, tetramethoxysilane, polymethoxysilane and a silane coupling agent.

* * * * *